United States Patent [19]

Wood

[11] 4,372,772
[45] Feb. 8, 1983

[54] PARABOLIC REFLECTOR COMPRISING A PLURALITY OF TRIANGULAR REFLECTING MEMBERS FORMING A REFLECTING SURFACE SUPPORTED BY A FRAMEWORK HAVING A PARTICULAR GEOMETRIC PATTERN

[76] Inventor: Douglas E. Wood, Box 32, Fox Island, Wash. 98333

[21] Appl. No.: 272,576

[22] Filed: Jun. 11, 1981

Related U.S. Application Data

[62] Division of Ser. No. 70,914, Aug. 29, 1979, Pat. No. 4,295,709.

[51] Int. Cl.³ .......................................... C03B 23/023
[52] U.S. Cl. ...................................... 65/106; 65/104; 65/107; 65/289; 264/2.7; 264/339; 350/295; 350/310
[58] Field of Search ................... 65/64, 102, 104, 106, 65/289, 107; 264/2.7, 339; 350/292, 295, 310

[56] References Cited

U.S. PATENT DOCUMENTS

| | | | |
|---|---|---|---|
| 2,707,903 | 5/1955 | Trombe | 350/292 |
| 3,261,016 | 7/1966 | Burr | 350/310 X |
| 3,822,122 | 7/1974 | Plumat et al. | 65/104 |
| 4,095,968 | 6/1978 | Bristow | 65/104 |
| 4,115,486 | 9/1978 | Cowman et al. | 264/2.7 |
| 4,199,342 | 4/1980 | Mestre et al. | 65/106 |

*Primary Examiner*—Arthur D. Kellogg
*Attorney, Agent, or Firm*—Cole, Jensen & Puntigam

[57] ABSTRACT

The geometric pattern for the support framework is obtained by projecting a subdivided icosahedron onto a parabolic surface. The resulting framework has forty primary planar triangular faces or sections, each of which are, in the embodiment shown, subdivided equally into 4 secondary planar triangular sections. At the dead center of the framework pattern is the outline of a pentagon, formed of five equal-size triangular sections. The framework terminates in a rim which lies completely in a single plane. Triangular reflecting members, which comprise the reflecting surface portion of the apparatus, are supported interiorly of the framework by standoff elements. Intermediate along each edge of the reflecting members is a tensioning element which bends the reflecting member so that the intermediate edge points, as well as the vertices of each reflecting member, lie on the surface of an imaginary paraboloid, the reflecting members thus approximating a parabolic curve.

6 Claims, 9 Drawing Figures

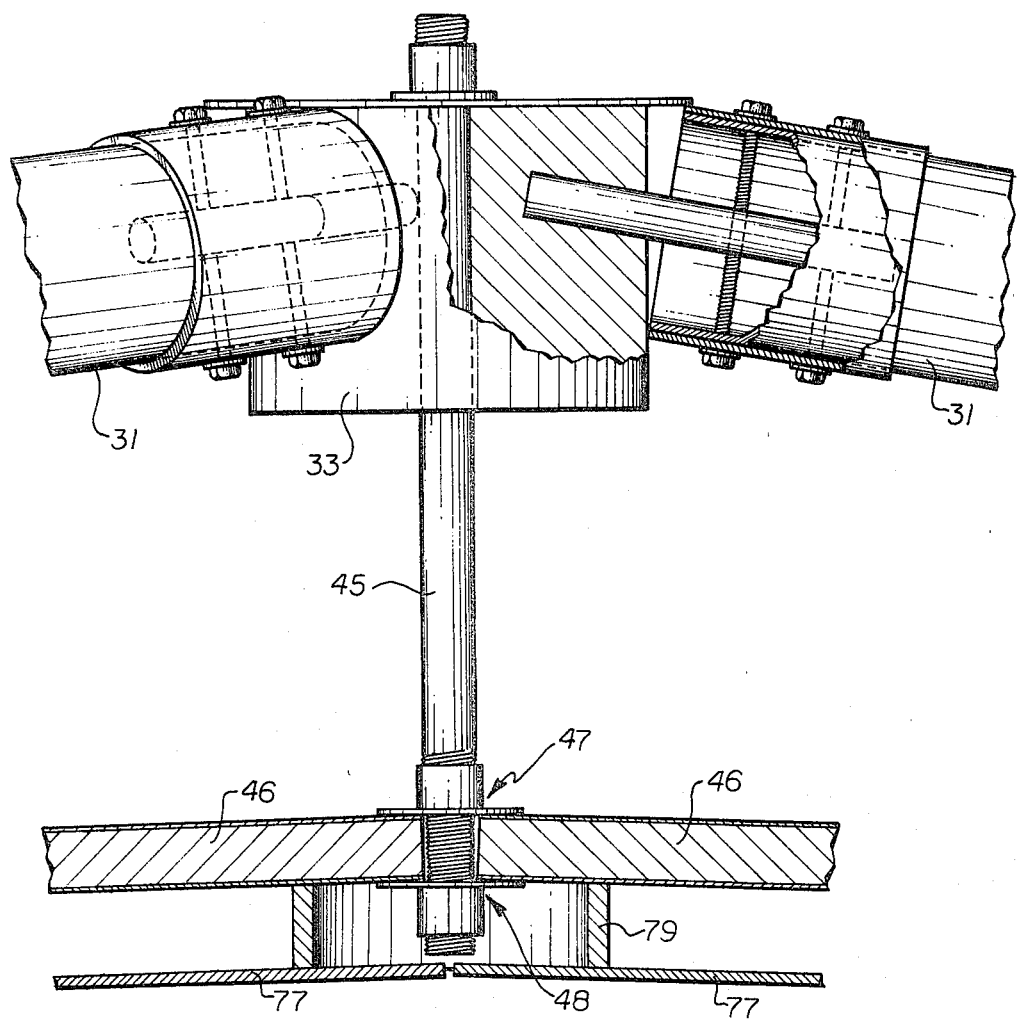
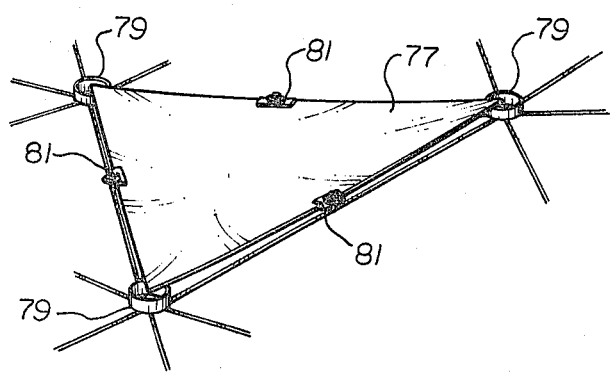

PARABOLIC REFLECTOR COMPRISING A PLURALITY OF TRIANGULAR REFLECTING MEMBERS FORMING A REFLECTING SURFACE SUPPORTED BY A FRAMEWORK HAVING A PARTICULAR GEOMETRIC PATTERN

This is a division of application Ser. No. 070,914, filed Aug. 29, 1979 now U.S. Pat. No. 4,295,709.

BACKGROUND OF THE INVENTION

This invention relates generally to the art of curved reflectors, such as those used as solar reflectors, and more particularly concerns a parabolic reflector which includes a reflecting surface which comprises a plurality of triangular sections and the framework to support the reflecting surface.

Generally, a paraboloid is an advantageous shape for a reflector as it has an inherent focusing capability, can be theoretically made quite large, and since it focuses on a point, instead of a line, can tolerate much greater focusing misalignment than other focusing reflectors. Thus, the design and construction of such a reflector is not as critical and hence generally less complex than other curved reflector systems, such as a trough system.

However, it is expensive and difficult to construct a parabolic reflecting surface from a single section of reflecting material, such as glass. An alternative to the single piece construction is the use of multiple sections. Parabolic reflectors have in fact previously been constructed from sections, but they have been impractical and inefficient, due to the geometry of the reflecting surface and the support structure therefore. One such technique is to project a plurality of equilateral triangles onto a parabolic surface, but the resulting structure is impractical and unstable, as its triangular sections vary widely in configuration, and the rim of the reflector is scalloped, which is a very difficult configuration to support.

When the parabolic configuration of a reflector is achieved by use of sections, plane reflecting members can be used, instead of curved members. This is desirable, as the cost of plane sections of glass is considerably less than curved glass. The use of slightly curved glass, however, would reduce the number of sections in the reflector, and would also increase the operating temperature of the unit, if desirable. It would reduce the cost of curved glass considerably if plane glass could be bent, but it has been heretofore accepted that plane glass cannot be bent to produce a curved surface, i.e. that only a minimal displacement of plane glass can be achieved before breakage occurs.

Thus, it is a general object of the present invention to provide a parabolic reflector and a supporting framework therefore which overcomes one or more of the disadvantages of the prior art noted above.

It is another object of the present invention to provide such a reflector apparatus which has a geometry particularly suitable for large dimension reflectors.

It is a further object of the present invention to provide such a reflector apparatus which comprises triangular sections which present approximately the same surface area relative to a point on the central axis of the reflector at infinity, i.e. relative to the sun.

It is an additional object of the present invention to provide such a reflector apparatus which is arranged so that its rim lies substantially in a single plane.

It is a still further object of the present invention to provide a system for bending plane sheets of glass so that they approximate a curve.

It is yet another object of the present invention to provide such a reflector apparatus in which otherwise plane sections of glass are bent and fitted together to form a substantially parabolic surface.

SUMMARY OF THE INVENTION

Accordingly, the present invention is a reflector apparatus which includes a rigid support matrix of substantially parabolic configuration, which comprises a plurality of strut-like members which are in turn joined together in a pattern which is produced by projecting an icosahedron, which is a twenty sided figure, or a subdivided portion thereof, onto a parabolic surface. The apparatus also includes a plurality of rigid reflecting members and a plurality of standoff means for supporting the reflecting members away from the support matrix in such an arrangement that they form a substantially parabolic reflecting surface.

The pattern of the strut-like members comprising the support matrix also may alternatively be characterized as including the outline of a pentagon which is centered at the center of the support matrix. In one embodiment, the pattern will also include the outline of five additional pentagons, arranged around the support matrix, with one vertex of each of the additional pentagons mating with one of the vertices of the center pentagon.

The present invention also includes a system for bending the otherwise plane substantially triangular sections of glass comprising the reflecting surface, wherein each triangular section includes vertices and edges extending between the vertices. The system includes means for supporting the triangular sections at each of its vertices, and means which are positioned along each edge of the triangular sections for applying pressure against that edge, forcing that edge into a configuration approaching a curve, so that the triangular section as a whole is curved.

DESCRIPTION OF THE DRAWINGS

A more thorough understanding of the invention may be obtained by a study of the following detailed description, taken in conjunction with the accompanying drawings in which:

FIG. 5 is a side elevational view of a first standoff element used between the support framework and the backing surface of the parabolic reflector apparatus of FIG. 1.

FIG. 9 is a schematic view showing one triangular reflecting member being supported and tensioned to simulate a parabolic curve.

DESCRIPTION OF PREFERRED EMBODIMENT

Figure 1:
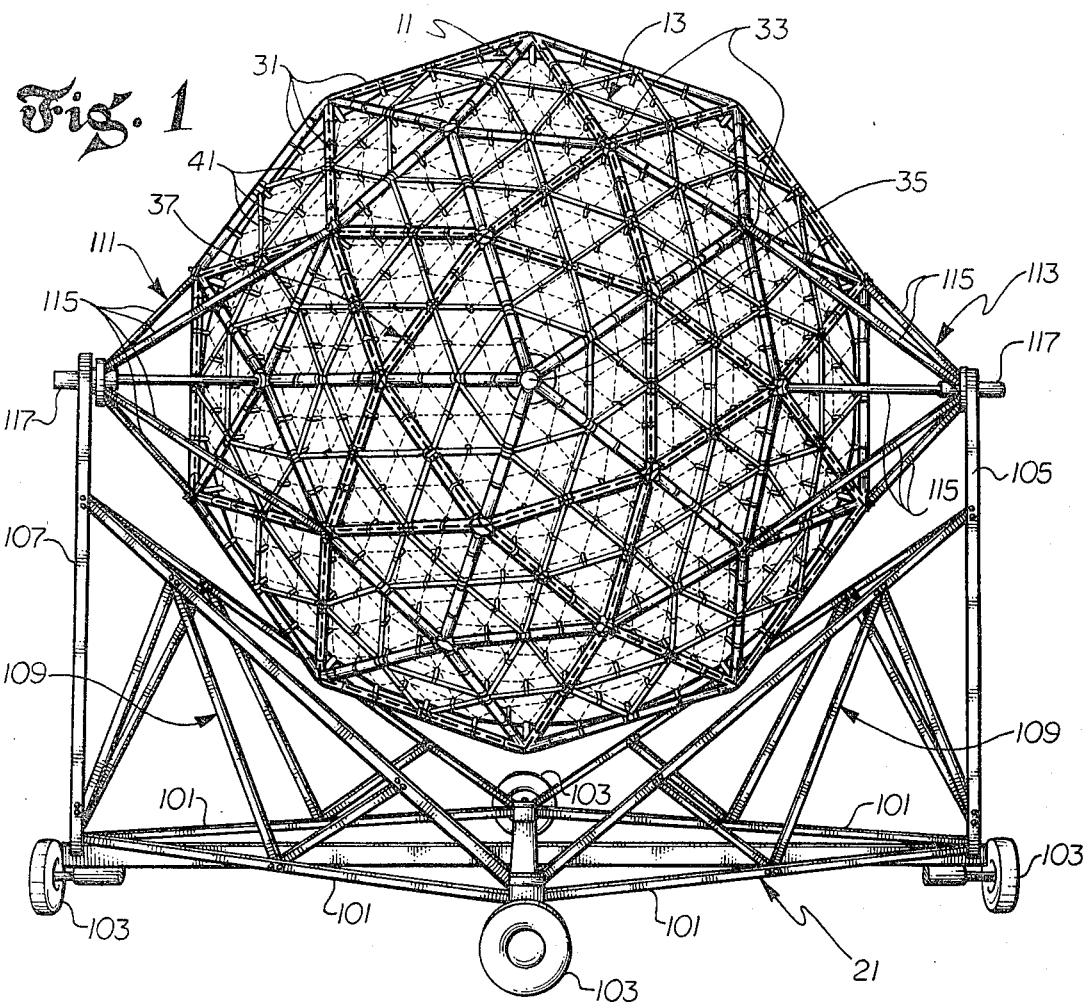
FIG. 1 is a rear elevational view of the parabolic reflector apparatus of the present invention.
Figure 2:
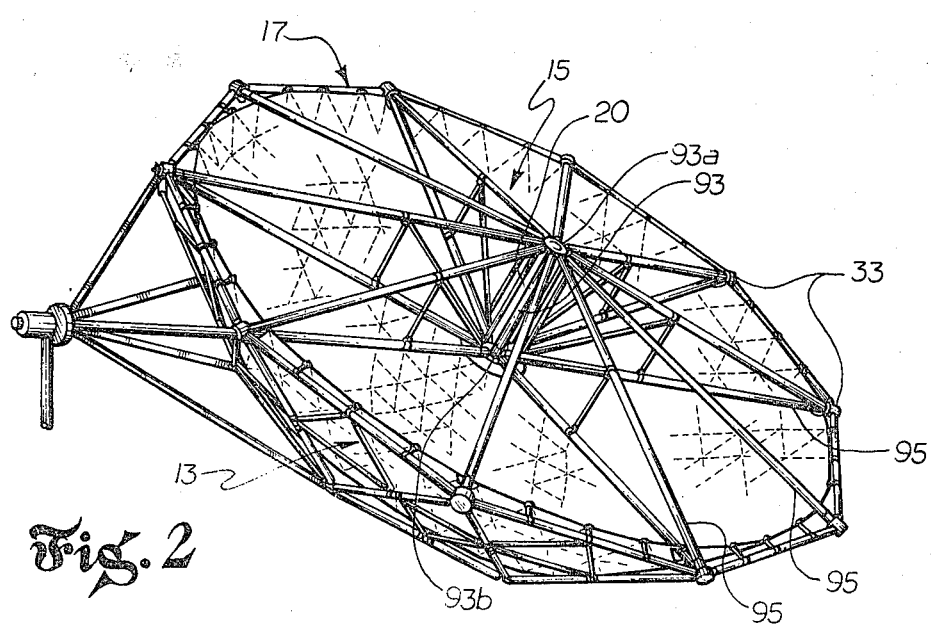
FIG. 2 is a front oblique view of the parabolic reflector apparatus of FIG. 1.
Figure 8:
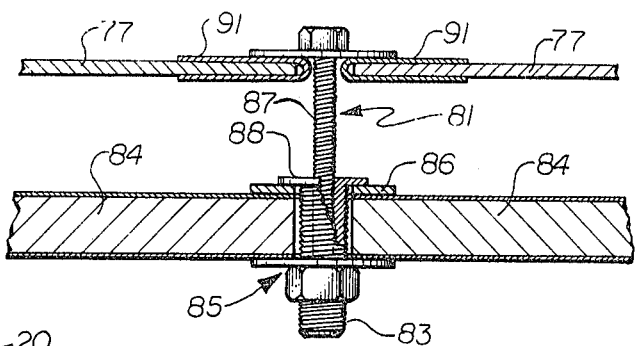
FIG. 8 is a side elevational view of a tensioning element used between the backing surface members and the reflecting members of the parabolic reflector apparatus of FIG. 1.
Figure 3:
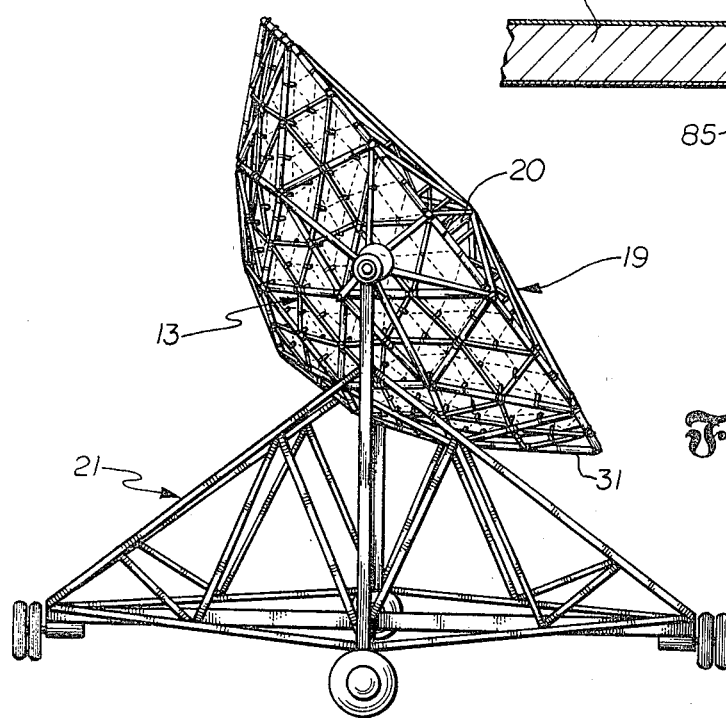
FIG. 3 is a side elevational view of the parabolic reflector apparatus of FIG. 1.

FIGS. 1, 2 and 3 show various views of the parabolic reflector apparatus of the present invention. Generally, the reflector apparatus includes a support framework 11 which comprises a number of elongated struts forming a plurality of triangular sections which together are arranged generally in the shape of a parabola. The reflecting surface is substantially parabolic, and the support framework is spaced from the reflecting surface by standoff supports positioned perpendicular to the reflecting surface, so that the geometry of the support framework 11 is such that the vertices of all the triangular sections lie substantially on the surface of an imaginary parabola.

Arranged interiorly of the support framework 11 is a protective backing surface referred to generally at 13. Backing surface 13 comprises a plurality of plane triangular sections, referred to as backing members, which are supported several inches off of support framework 11 by a number of different standoff elements which are not shown clearly in FIGS. 1–3 but which are shown in other figures and described in more detail in following paragraphs.

Backing surface 13 generally follows the form of support framework 11. In the embodiment shown, four equal size triangular backing members fit together and are arranged to be in registry with the outline of one of the secondary triangular sections comprising support framework 11. The backing members, however, are solid and fit together to present a continuous surface interiorly of support framework 11.

The reflecting surface, shown generally at 15, which comprises a plurality of triangular mirrored glass sections, referred to as reflecting members, is supported interiorly of the backing surface 13. Each reflecting member is supported at each vertex, and also at the midpoints of its three edges, by means of tensioning members connected to the backing surface 13, which are disclosed in detail hereinafter. The tensioning members bend the reflecting members so that they more closely resemble a curved surface. The reflecting members in the embodiment shown comprising the reflecting surface 15 are substantially the same size and are substantially in registry with the triangular backing members, comprising protective backing surface 13.

Hence, when the reflector apparatus of the embodiment shown in FIGS. 1–3 is observed from the rear, the support framework 11 is visible, as is the solid protective backing surface 13, through the support framework. The reflecting surface 15, however, is not visible from the rear. When the reflector apparatus is viewed from the front, however, the reflecting surface 15 is seen but not protective backing surface 13, nor support framework 11, as the glass sections comprising the reflecting surface form a substantially continuous surface.

The support framework 11 terminates in a rim 17. Secured to the rim is a reflector face structure referred to generally at 19. The face structure 19 extends radially outwardly from a point 20 which is approximately central of the aperature of the reflector to the rim 17, and stabilizes the support framework 11 into a rigid, unitary structure, an important structural aspect of the invention.

The final portion of the reflector apparatus is the support carriage, referred to generally at 21, which is a rigid framework connected to opposite sides of the support framework 11. It holds the support framework 11, and hence the reflector apparatus as a whole, securely for rotation about two axes, the rotation about one axis permitting a change in altitude of the reflector, so that the reflector may follow a target from horizon to directly overhead to the horizon, while rotation about the other axis permits the reflector to be moved along a line at a given altitude.

The reflector apparatus of the present invention is particularly useful as a solar reflector, but it should be understood that the apparatus may be useful in other applications requiring large aperature parabolic reflectors.

FIG. 1 shows the supporting framework 11 of the reflector apparatus most clearly. The geometry of the framework is a significant aspect of the overall design of the parabolic reflector apparatus. It is important, for instance, that the framework have such a configuration that the triangular sections thereof present approximately the same surface area relative to a point on the axis of the reflector above the rim at infinity, i.e. relative to the sun, for instance. It is also important that the rim of the support framework 11 lie substantially in a single plane, so that the necessary system rigidity can be accomplished in a relatively simple straightforward manner, such as through the use of face struts.

Both of the objects are accomplished by the framework shown in FIG. 1. The geometric pattern of the framework is developed by projecting the lower half of an icosahedron, which is a solid figure with twenty plane surfaces, in this case, of equal size, onto a parabolic surface. This projection determines the position of the primary struts, which are shown as the large diameter struts in FIG. 1. The portion of the pattern of FIG. 1 which appears as a plurality of small diameter struts is achieved by either subdividing the icosahedron once, or by subdividing the pattern formed by the large struts. In either case, the triangular sections formed by the large struts are subdivided into four equal size triangles. The pattern formed by the large struts is referred to as a two frequency configuration while the pattern formed by the combination of the large struts and the small struts is a four frequency configuration.

The reflector apparatus shown in the drawings is approximately 30 feet in diameter and is approximately 10 feet deep. The focal point is at one-half of the depth so that it is half-way between the bottom of the framework 11 and the rim 17. The geometry for this pattern was produced by projecting the lower half of an icosahedron from a point on the axis of the reflector at a height of 10 ft. from the bottom of the parabola. The depth and focal point of the reflector can be varied so that a shallower or deeper configured reflector can be produced. In some applications, a shallower configuration in particular may be desirable, as less glass, with a smaller curvature, is required for such a configuration.

The projection of the icosahedron is, in the embodiment shown, oriented so that a portion of the pattern of the framework is a pentagon 37, formed of five equal sized, primary triangular sections, at the rear center of the reflector. If the projection of the icosahedron is rotated, the pentagon moves off the rear center of the framework. The framework 11 itself comprises a first set of large-diameter principal struts 31 which are each approximately 6 to 9 feet long and 4 inches in diameter. In the embodiment shown, struts 31 are aluminum irrigation pipe. The struts 31 meet at central hubs 33 to form the large triangular sections. The hubs 33 are in the form of cylindrical sections, and comprise solid blocks of aluminum. The hubs 33, FIG. 5, are approximately 8 inches in diameter and 5 inches high, and have cylindrical sleeve portions extending radially therefrom, about their circumference, at angles of between 53°–64° relative to each other. The principal struts 31 fit into, and are secured to, the sleeve portions. The details of the hub design, however, are not an important aspect of the present invention and may be varied considerably.

A hub 35 is located at the rear dead center of the reflector framework, and is the center of the pentagon 37. The five sides of the pentagon 37 extend around hub 35. The framework pattern in the embodiment shown is also characterized by five additional pentagons, each pentagon having one side which forms a portion of the rim 17 and a vertex opposite from the one side which is coincident with one of the vertices of the central pentagon 37. The principal strut structure of FIGS. 1–3 is completed by adding struts between the respective one side of the additional pentagons on the rim, which completes the rim. The resulting structure is a two frequency configuration. The geometry of the framework is thus dominated by the arrangement of the five pentagons.

A rotation of the projection of the icosahedron will result in the pattern of FIG. 1 being shifted, in the direction of the rotation, so that the pentagon pattern is no longer centered.

Thus, the two frequency pattern framework constructed with the principle struts 31 is an arrangement of primary triangular sections, which in turn are grouped in a fashion to emphasize the pentagon shape. In the embodiment shown, the primary triangular sections are subdivided into four secondary triangular sections of equal size by the secondary struts 41. The secondary struts 41 connect the midpoints of adjacent sides of the struts comprising the primary triangular sections. Struts 41 are also irrigation pipe, approximately 3–4½ feet long and two inches in diameter. The secondary struts 41 are connected to the primary struts by means of a collar or similar device. The struts 41 thus subdivide each of the primary triangular sections formed by the principal struts 31 into four equal sized smaller triangles. The resulting framework is a four frequency configuration pattern.

Since the location of the struts 41 and 33 is determined by a projection of the icosahedron onto a parabola, and then a further small projection normal to the parabola to make room for the reflecting surface and the protective backing surface, the ends of the struts, i.e. the hubs 33, will be substantially on the surface of an imaginary parabola slightly larger than the parabolic reflecting surface. The struts, themselves, being straight, are slightly off the parabolic surface. The above arrangement is such, however, that the rim of the framework lies completely in a single plane, and the surface area of each of the triangular sections, and hence also the triangular reflecting members, relative to the sun is approximately the same, two of the principal objectives of the present invention.

Figure 4:
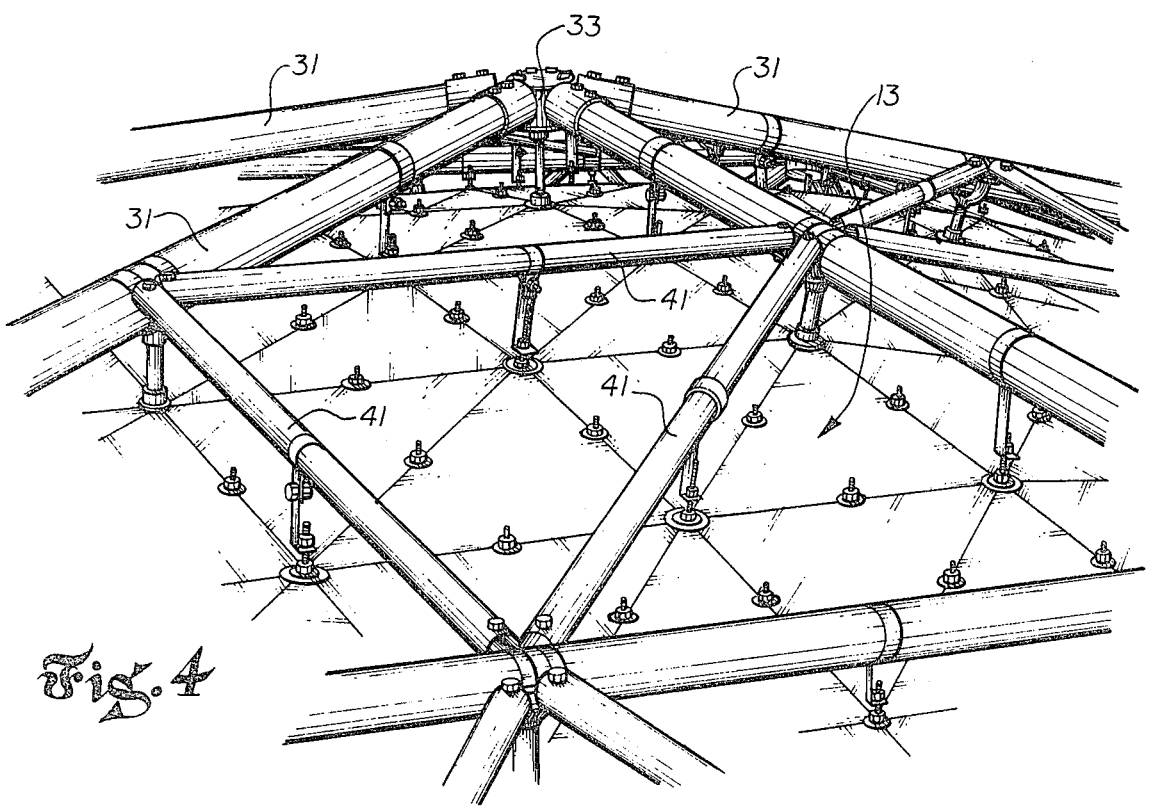
FIG. 4 is a close-up view of a portion of the reflector apparatus of FIG. 1, showing the framework, the standoff elements and the protective backing surface.
Figure 6:
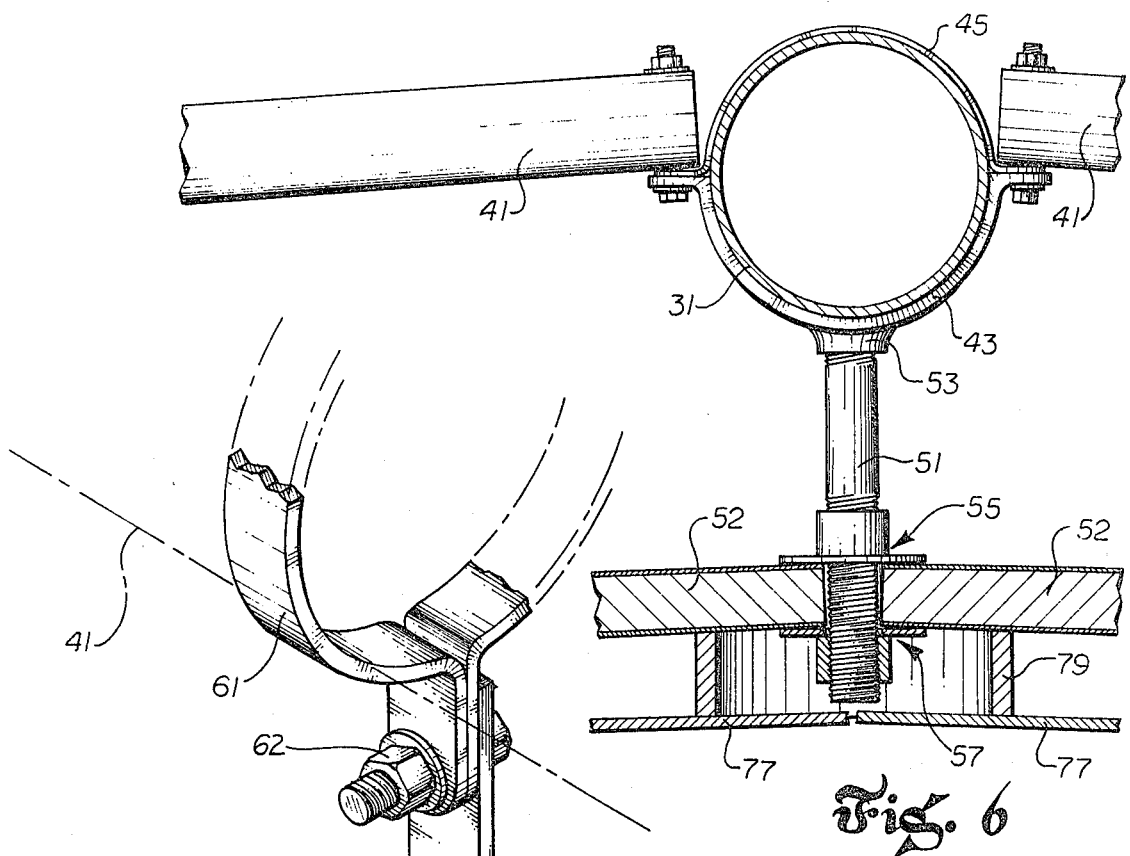
FIG. 6 is a side elevational view of a second type of standoff element used between the support framework and the backing surface of the parabolic reflector apparatus of FIG. 1.

In the embodiment shown, the protective backing surface 13 is supported interiorly of the support framework 11 by standoff elements, shown in FIGS. 4, 5 and 6. The backing surface, in the embodiment shown, comprises a plurality of triangular backing members sized and arranged so that four such backing members are in registry with each secondary triangular section of the support framework 11. A first type of standoff element is used at hubs 33, while a second standoff element is used at the intersection of the principal struts 31 and the secondary struts 41, and a third standoff element is used at the midpoint of the secondary struts 41.

Although the standoff elements shown are adapted for the embodiment shown, i.e. to support the backing surface, similar standoff elements could be used to directly support the reflecting surface.

The relationship between the support framework, the various standoff elements and the backing members is shown most clearly in FIG. 4. The configuration of the various standoff elements shown, however, can be substantially varied. Further, it is not necessary that different kinds of standoff elements be used, although in the embodiment shown it is convenient to do so.

The first standoff element is shown in FIG. 5, and extends from the hubs 33. The standoff element includes a bolt 45 threaded on both ends, approximately 1 inch in diameter, which extends perpendicularly from the center of the hubs 33 approximately 13 inches towards the interior of the reflector. At approximately 12 inches from the center of the hub is a first nut and washer set 47. The vertices of the triangular back members 46 are held in place against nut and washer set 47 by a second nut and washer set 48. Thus, the portions of the triangular backing members 46 near the vertices thereof are securely held in place between the respective washers of the two nut and washer sets. Typically, the vertices of six triangular backing members will be held in place by each of the first standoff elements.

The second standoff element is shown in FIG. 6. Second standoff elements are located at the intersection of the principal struts 31 and the secondary struts 41. The standoff element extends from a connecting element which includes a first hemispherical band 43 which fits around the lower half of the principal strut 31 and two second hemispherical bands 45 which fit around the lower half of the principal strut 31 and two second hemispherical band 45 which fits around the top half of the principal strut, one for each pair of secondary struts. The bands 43 and 45 are connected together at their respective end edges and to the secondary struts 41, thus securing together the principal and the secondary struts.

The second standoff element includes a section of pipe 51, approximately one inch in diameter and threaded at both ends. One end is threaded into a receiving portion 53 in the first hemispherical band 43. The section of pipe 51 extends substantially perpendicularly from the principal strut to which it is secured approximately 2–6 inches inwardly of the reflector. The backing members 52 are held in place by first and second nut and washer sets 55 and 57, positioned on either side of the backing members 52, similar to the first stand-off element.

Figure 7:
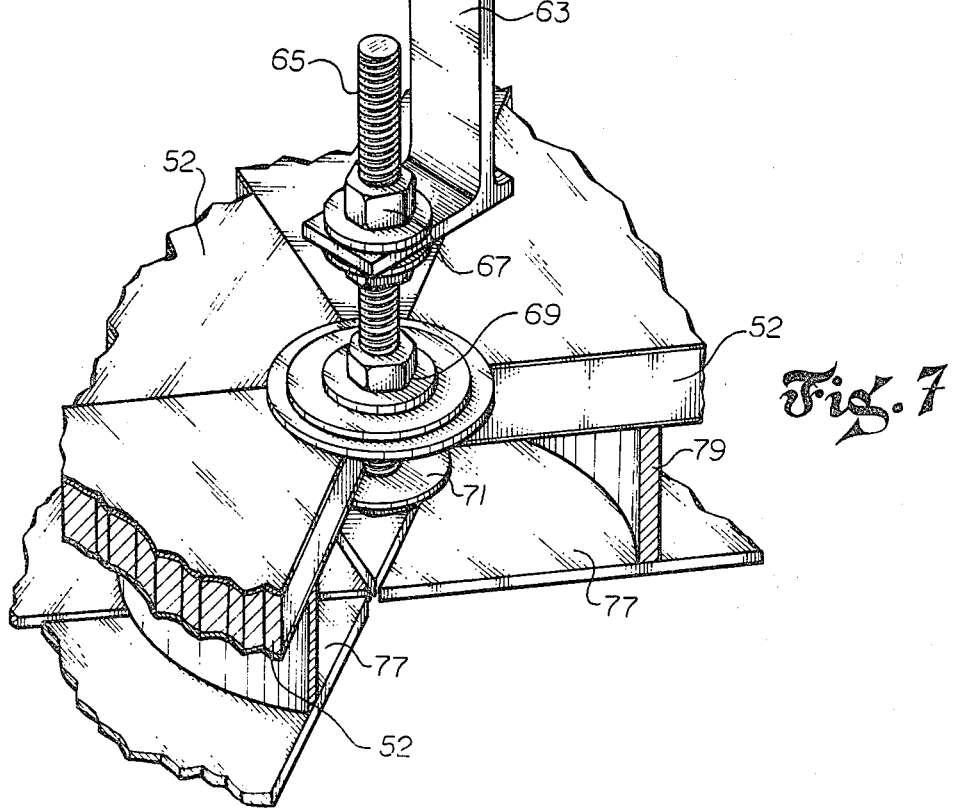
FIG. 7 is a side elevational view of a third type of standoff element used between the support framework and the backing surface of the parabolic reflector apparatus of FIG. 1.

The third standoff element is shown in FIG. 7. The third standoff elements are located both at the midpoints of the secondary struts 41 and on the principal struts 31 midway between the intersection of the principal struts 31 with the secondary struts 41 and hubs 33.

This is shown most clearly in FIG. 4. The third standoff element includes a collar 61 which extends around the struts and is secured by a bolt and nut arrangement 62. Extending away from the collar 61 is an L-shaped brace 63 which is secured at one end to the collar at bolt arrangement 62 and at the other end to a threaded bolt 65 through a dual nut and washer arrangement 67. The position of the brace 63 relative to the threaded bolt 65 may be varied through the nut and washer arrangement 67. The brace 63 and the threaded bolt 65 extend perpendicularly from the struts, inwardly of the reflector, like the first and second standoff elements. The triangular backing members are then held in place at a selected position along threaded bolt 65 by nut and washer sets 69 and 71 in a manner similar to that of the first and second standoff elements of FIGS. 4 and 5.

The position of the backing members relative to the struts may be easily adjusted at all of the standoff elements by adjustment of the nut and washer sets holding the vertices of the triangular backing members in place.

The backing members in the embodiment shown are triangles configured and sized so that four equal size backing members together are the same size as a secondary triangular section. Since there are four backing members for each secondary triangular section, the outline of backing members form an eight frequency configuration. The triangular backing members abut together at their edges, so that a continuous backing surface is formed, as explained above. The backing members, being plane sections, like the triangular sections comprising the support framework, are a plane surface approximation of a parabola.

The backing members, in the embodiment shown, are triangular sections of balsa wood, approximately one-quarter inch thick, faced by aluminum sheets approximately 1/32 inch thick, while results in a high strength, but relatively light, backing surface. The purpose of the backing surface is to provide protection for the reflecting surface portion of the apparatus, which is supported interiorly of the backing surface. The backing surface is thus located between the support framework and the reflecting surface. Hail and other wind borne debris would otherwise likely damage the reflecting surface without the backing surface. However, the backing surface is not necessary, per se, to the function of the present invention. In addition, other protective surfaces are possible, such as for instance, sheet aluminum, which could be positioned on the exterior of the apparatus.

The reflecting surface 15 comprises a plurality of triangular reflecting sections of mirrored glass, which, in the embodiment shown, have a size and configuration identical to the triangular backing members, and in fact are arranged so that they are in registry with the backing members. However, in other embodiments, it is possible that the reflecting members would be the same size as, and in registry with, the secondary triangular sections of the support framework 11.

The reflecting members in the embodiment shown comprise plane sections of annealed glass approximately 0.09 inches thick. The members are triangular and vary from 16 to 23 inches on a side. The reflecting members are held in place by structure shown principally in FIG. 9, and also in FIGS. 5, 6, 7 and 8. Around each nut and washer set of the standoff elements on the interior side of the backing surface 13 is positioned a collar 79 of plastic material approximately three inches in diameter and one inch high. Collars 79 are not secured to the backing surface, although they could be in a given application.

The reflecting members 77 are positioned so that the vertices of each member lie on the collar 79 and are supported thereby, as shown in FIG. 9, with each reflecting member 77 being in registry with a corresponding backing member. The reflecting sections 77 are held in place against the collars 79 at each vertex by tensioning members 81, shown in detail in FIG. 8. Tensioning members 81 are located midway along each of the edges of the reflecting members 77, and extend from corresponding backing members, where they are fixedly positioned.

In the embodiment shown, the tensioning member includes a special rivet, which is threaded both on its inside and outside surfaces. Near the head end 83 of the rivet is positioned a washer and nut combination 85. Two abutting backing members 84 rest against the washer, while the rivet extends upwardly through the backing members. The edges of the backing members are cut out slightly to permit this. A threaded nut 86 holds the rivet in place relative to the backing members. A bolt 87 is threaded into the interior of the rivet at the other end 88 of the rivet sufficiently that approximately an inch of space exists between the head of bolt 87 and the other end 88 of the rivet.

The edge of a reflecting member 77 is held in a U-shaped rubber element 91, which protects the edge thereof. Threading the bolt 87 further into the rivet will force the edge of reflecting member 77 towards the backing member, with the vertices of the reflecting members remaining relatively fixed in position on the collars 79. This action tensions the reflecting member against the collars. Usually a single tensioning element 81 will serve two abutting reflecting members.

Such an arrangement, with the vertices of the reflecting members being freely supported, while the midpoints of the edges of the reflecting members are drawn toward the backing surface, results in the otherwise plane glass reflecting members actually being bent into a curve to a significant extent. This action is shown most clearly in FIG. 9. With the embodiment shown, a section of glass approximately 20" on its side has been drawn inwardly 0.38 inches. The result is that not only the vertices of the reflecting sections, but also the midpoints of the edges thereof theoretically lie on a parabolic surface. This substantially tightens the focus of the reflector and increases the temperature of the system. In the embodiment shown, the temperature in a boiler at the focus of the reflector increases from approximately 800° F., for plane glass, to approximately 2000° F., for curved glass. In some applications, however, this is not significant, as the temperature of the end energy should be 350° F. to 550° F. in many instances. However, the use of curved glass makes it possible to reduce the number of reflecting members by increasing their size, without detracting from the operation of the system. Thus, the use of curved glass does have advantages in certain applications. The system described above results in glass being bent to an extent previously thought not possible.

The framework and the reflector apparatus as a whole is stabilized by the means of a face structure shown most clearly in FIG. 2. The facial structure 19 includes a central strut portion 93, which is an elongated strut approximately 4 inches in diameter and approximately 60 inches long. The central strut portion 93 is positioned along the central axis of the reflector.

Extending between the respective ends 93a and 93b of the central strut 93 and the rim 17 are a plurality of radiating struts 95. These radial struts 95 are lengths of irrigation tubing approximately 16½ feet long and approximately 4 inches in diameter. A first set of radial struts connects the outer end 93a of central strut 93 to the rim 17. The central strut 93 is positioned so that the first set of radial struts are at an angle of approximately 10° relative to the plane of the rim. Although it is shown as being 10° in FIG. 3, this angle could be varied substantially. In the embodiment shown, there are ten struts in the first set of struts, so that there is an angle of 36° between adjacent struts. The struts terminate at the hubs on the rim of the framework, with each hub receiving a face strut.

The struts in the second set of struts extend from the lower end 93b of central strut 93 to the hubs on the rim of the framework. In the embodiment shown, there are six struts in the second set, two adjacent struts to each side where support structure is secured to the reflector, and one additional strut between the two pairs of adjacent struts in each direction along the rim. This strut pattern may, of course, be altered within the spirit of the present invention.

Cross braces between the two sets of struts may also be provided, as shown, so that if necessary, the central strut 93 may be removed, and a boiler or similar device positioned therein. The face strut structure 19 provides the necessary stability for the entire reflector apparatus, and is important to the overall function of the apparatus. The arrangement and number of the struts comprising the structure 19, however, may be varied depending upon the application.

Although not shown in the drawings, a steam boiler may be added to the apparatus when the reflector is to be used as a solar collector. The boiler may take various configurations; one example is shown in a copending application of the present inventor titled: Apparatus for Supporting Large Dimension Curved Reflectors, Ser. No. 842,743, filed Oct. 17, 1977, the subject matter of which is hereby incorporated by reference.

FIGS. 1, 2 and 3 show the support carriage for the reflector apparatus of the present invention. Although a particular embodiment is shown in the drawings, it should be understood that the apparatus may take many different forms to permit the necessary reflector movement in a given application. The support structure shown generally at 21 rests on a four sided square base comprising four beams 101, each corner of which is supported by a tire 103 on an axle. The tires may run on a circular, reinforced concrete track. This permits rotation of the reflector apparatus about a vertical axis in a horizontal plane.

Extending upwardly from two opposed corners of the base are upright supports 105 and 107, which are braced to the other corners and to the base of the support carriage by a plurality of bracing members shown generally at 109. Other bracing configurations could, of course, be used. The support framework 11 of the parabolic reflector apparatus is rotatably secured to the upright supports 105 and 107 through support connections 111 and 113. Each support connection comprises a framework of rigid struts 115, each of which at one end are fixedly secured to a hub of the support framework of the reflector apparatus and at the other end meet with other ends of struts 115 at an axle 117 which rotatably rides in an opening at the upper ends of the upright supports 105 and 107.

In the embodiment shown, there are five struts in each support connection, and the pattern of connection of struts 115 to the support framework 11 is shown in FIGS. 1 and 3. Such an arrangement, however, could be varied within the spirit of the present invention. The support connections permit the reflector to be rotated in a vertical plane, about a horizontal axis determined by the location of axles 117.

The support carriage shown, while being primarily for illustration, does permit the reflector apparatus two degrees of rotational movement, which is important in a solar tracking application, one in a vertical plane about a horizontal axis and the other in a horizontal plane about a vertical axis.

Thus, an apparatus has been described and shown which incorporates a particular geometric pattern in its structural arrangement, a pattern which has operational and construction advantages. The resulting reflector structure is structurally rigid and stable, yet is relatively uncomplicated and inexpensive. Such a structure has applications in many areas, including use as a solar collector. Also, structure has been described for bending otherwise plane glass sections to a significant curvature, a result which is useful in the parabolic reflector application described, as well as other applications.

Although a preferred embodiment of the invention has been disclosed herein for purposes of illustration, it should be understood that various changes, modifications and substitutions may be incorporated in such embodiment without departing from the spirit of the invention, as defined by the claims which follow.

What is claimed is:

1. A system for curving plane sections of glass having front and back surfaces, wherein the plane sections are first configured such that they have a triangular outline, the resulting triangular sections including vertices and edges extending between the vertices, the system further comprising:

a. means for supporting the triangular sections at each vertex thereof such that the respective vertices tend to remain in their respective positions;
   b. means positioned in the vicinity of each edge of the triangular sections for forcing each edge to curve between its respective vertices, which results in the front and back surfaces of the triangular sections defining a compound curve.

2. A system of claim 1, wherein said edge forcing means includes a tensioning member, one end of which is maintained substantially stationary, said tensioning means including means for holding an edge of a triangular section and means for moving said holding means, and hence an edge of a triangular section, gradually toward said one end of said tensioning means, thereby forcing the edge to curve.

3. A system of claim 1, wherein said edge forcing means are located at substantially the midpoint of each edge of the triangular sections.

4. A system of claim 3, wherein said vertex supporting means are configured so that the vertices of said triangular sections rest on an associated vertex supporting means and are free to move thereon.

5. A method for curving plane sections of glass having front and back surfaces, said method comprising the steps of:

a. configuring the plane sections of glass such that they have a triangular outline, wherein the resulting triangular sections include vertices and edges extending between said vertices;

b. supporting said triangular sections at each vertex thereof so that the respective vertices tend to remain in their respective positions; and
c. forcing each edge of said triangular section to curve between its respective vertices, which results in the front and back surfaces of the triangular sections defining a compound curve.

6. A method of claim 5, wherein the force of the step of forcing occurs at substantially the midpoint of each edge of said triangular sections.

* * * * *